(12) United States Patent
Gormish et al.

(10) Patent No.: US 10,445,870 B2
(45) Date of Patent: *Oct. 15, 2019

(54) LINEAR GROUPING OF RECOGNIZED ITEMS IN AN IMAGE

(71) Applicant: Ricoh Company, Ltd., Tokyo (JP)

(72) Inventors: Michael J. Gormish, Menlo Park, CA (US); Edward Schwartz, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,720

(22) Filed: May 24, 2018

(65) Prior Publication Data

US 2018/0268537 A1 Sep. 20, 2018

Related U.S. Application Data

(63) Continuation of application No. 14/975,630, filed on Dec. 18, 2015, now Pat. No. 9,984,451.

(51) Int. Cl.
*G06T 7/00* (2017.01)
*G06K 9/62* (2006.01)
(Continued)

(52) U.S. Cl.
CPC .............. *G06T 7/0004* (2013.01); *G06K 9/52* (2013.01); *G06K 9/6215* (2013.01);
(Continued)

(58) Field of Classification Search
CPC ........... G06K 9/00315; G06K 9/00281; G06K 9/00335; G06K 9/00248; G06K 9/00221; G06K 9/00597; G06K 9/00268; G06K 9/00302; G06K 2017/0051; G06K 2209/27; G06K 9/46; G06K 9/4671; G06K 9/6218; G06Q 30/02; G06Q 30/0201; G06Q 10/087; G06Q 10/0875; G06Q 20/12;
(Continued)

(56) References Cited

U.S. PATENT DOCUMENTS 5,974,396 A * 10/1999 Anderson .............. G06Q 30/02
705/14.25
6,944,331 B2 9/2005 Schmidt et al.
(Continued)

FOREIGN PATENT DOCUMENTS

EP 2913779 9/2015
WO 2015086537 6/2015

OTHER PUBLICATIONS

Chaves et al. "Finding Misplaced items in Retail by Clustering RFID Data," dated Mar. 22, 2010, 12 pages.
(Continued)

*Primary Examiner* — Kim Y Vu
*Assistant Examiner* — Michael J Vanchy, Jr.
(74) *Attorney, Agent, or Firm* — Patent Law Works LLP

(57) ABSTRACT

A system and method that determines multiple linear groups of horizontally placed items in an image is disclosed. The method includes receiving an image including a portion of a shelving unit, identifying a plurality of items in the image, determining a plurality of facings, clustering the plurality of facings, merging a plurality of clusters and determining a list of linear groups in the image.

20 Claims, 13 Drawing Sheets

(51) Int. Cl.
*G06T 7/70* (2017.01)
*G06K 9/52* (2006.01)
*G06T 7/73* (2017.01)
*G06T 7/60* (2017.01)
*G06T 7/30* (2017.01)
*G06K 9/32* (2006.01)

(52) U.S. Cl.
CPC ......... *G06K 9/6218* (2013.01); *G06K 9/6267* (2013.01); *G06T 7/30* (2017.01); *G06T 7/60* (2013.01); *G06T 7/70* (2017.01); *G06T 7/73* (2017.01); *G06K 9/32* (2013.01); *G06T 2207/30108* (2013.01)

(58) Field of Classification Search
CPC .. G06Q 20/203; G06Q 30/0639; G06Q 50/28; G08B 13/248; G08B 13/246; G01G 19/4144; G01G 23/3735; G06T 2207/30242; G09G 2380/04; H04N 7/181
See application file for complete search history.

(56) References Cited

U.S. PATENT DOCUMENTS

| | | | |
|---|---|---|---|
| 7,496,218 | B2 | 2/2009 | Ramsay et al. |
| 7,953,299 | B2 | 5/2011 | Shiiyama |
| 8,189,855 | B2 * | 5/2012 | Opalach .............. G06Q 10/087 382/100 |
| 8,774,458 | B2 | 7/2014 | Ogawa |
| 9,984,451 | B2 * | 5/2018 | Gormish .............. G06T 7/0004 |
| 2003/0083850 | A1 | 5/2003 | Schmidt et al. |
| 2006/0013463 | A1 | 1/2006 | Ramsay et al. |
| 2008/0089615 | A1 | 4/2008 | Shiiyama |
| 2010/0208942 | A1 * | 8/2010 | Porter ................... H04N 13/122 382/106 |
| 2012/0243737 | A1 | 9/2012 | Ogawa |
| 2012/0323620 | A1 * | 12/2012 | Hofman ................. G06Q 10/06 705/7.11 |
| 2015/0052027 | A1 | 2/2015 | Pavani et al. |

OTHER PUBLICATIONS

European Search Report for EP Application No. 16201851.9 dated May 30, 2017, 10 pages.
Gormish, "Linear Group Formation for Ocutag Retain Execution (ORE)," dated Oct. 23, 2015, 14 pages.
Kok, "Assortment Planning: Review of Literature and industry Practice," dated 2009, 55 pages.
Moraleda et al., "Toward Massive Scalability in Image Matching," in Pattern Recognition (ICPR), 20th International Conference, dated Aug. 2010, pp. 4.
Murrary et al., "Joint Optimization of Product Price, Display Orientation and Shelf-Space Allocation in Retail Category Management," in Journal of Retailing, dated 2010, 12 pages.
Non-Final Office Action for U.S. Appl. No. 14/975,630 dated Jul. 13, 2017, 26 pages.
Shankar et al., "An Across-Store Analysis of Intrinsic and Extrinsic Cross-Category Effects," dated 2014, 12 pages.
Urban, "An Inventory-Theoretic Approach to Product Assortment and Shelf-Space Allocation," in Journal of Retailing, dated 1998, 21 pages.

* cited by examiner

LINEAR GROUPING OF RECOGNIZED ITEMS IN AN IMAGE

CROSS-REFERENCE TO RELATED APPLICATIONS

This application is a continuation of and claims priority under 35 U.S.C. § 120 to U.S. patent application Ser. No. 14/975,630, filed Dec. 18, 2015, entitled "Linear Grouping of Recognized Items in an Image," which is incorporated herein by reference in its entirety.

BACKGROUND

Field of the Invention

The specification generally relates to collecting recognized items of an image into facings of vertically stacked items and linear groups of horizontally placed items. In particular, the specification relates to a system and method for generating a list of recognized items and converting the list of recognized items to a structured list of linear groups of horizontally placed items.

Description of the Background Art

A planogram is a visual representation of products in a retail environment. For example, a planogram may describe where in the retail environment and in what quantity products should be located. Such planograms are known to be effective tools for increasing sales, managing inventory and otherwise ensuring that the desired quantity and sizes of an item are placed to optimize profits or other parameters. However, presentation and maintenance of adequate levels of stock on shelves, racks and display stands is a labor-intensive effort, thereby making enforcement of planograms difficult. While the location and quantity of products in retail stores can be manually tracked by a user, attempts are being made to automatically recognize the products and automatically or semi-automatically obtain information about the state of products for planogram compliance.

Previous attempts at recognizing planogram compliance have deficiencies. For example, one method to place cameras in retail stores and determine out of stock scenarios. Unfortunately, such methods of planogram compliance can still not be reliable and productive.

SUMMARY

The techniques introduced herein overcome the deficiencies and limitations of the prior art, at least in part, with a system and method for multiple linear groups of horizontally placed items in an image. In one embodiment, the system includes a grouping application. The grouping application receives an image including a portion of a shelving unit. The grouping application further identifies a plurality of items in the image. From the plurality of items, the grouping application determines a plurality of facings. Further, the grouping application clusters the plurality of facings and merges the plurality of clusters. Finally, the grouping application determines a list of linear groups in the image.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
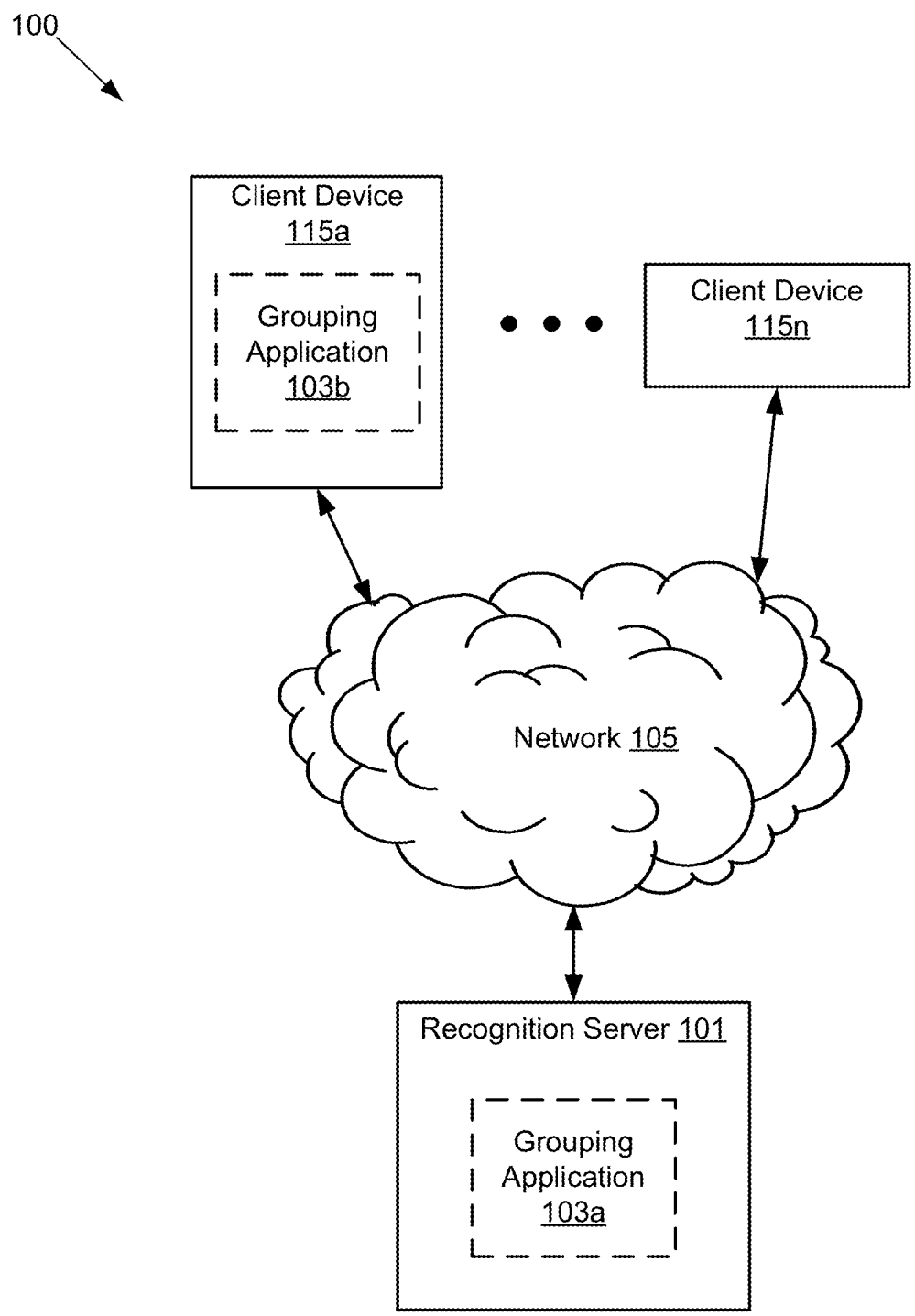
FIG. 1 is a high-level block diagram illustrating one embodiment of a system for determining multiple linear groups of horizontally placed items in an image.

FIG. 1 is a high-level block diagram illustrating one embodiment of a system 100 for determining multiple linear groups of horizontally placed items in an image. The illustrated system 100 may have one or more client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In some embodiments, the system 100 includes a recognition server 101 coupled to the network 105. The recognition server 101 may be, or may be implemented by, a computing device including a processor, a memory, applications, a database, and network communication capabilities. In the example of FIG. 1, the components of the recognition server 101 are configured to implement a grouping application 103a described in more detail below. In one embodiment, the recognition server 101 provides services to a consumer packaged goods firm for identifying products on shelves, racks, or displays and determining a structured way to arrange a placement of the products. While the examples herein describe recognition of products in an image of shelves, such as a retail display, it should be understood that the image may include any arrangement of organized objects. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc. For purposes of this application, the terms "item," "object" and "product" are used interchangeably to mean the same thing, namely, a material thing that can be seen and/or touched.

In some embodiments, the recognition server 101 sends and receives data to and from other entities of the system 100 via the network 105. For example, the recognition server 101 sends and receives data including images to and from the client device 115. The images received by the recognition server 101 can include an image captured by the client device 115, an image copied from a website or an email, or an image from any other source. Although only a single recognition server 101 is shown in FIG. 1, it should be understood that there may be any number of recognition servers 101 or a server cluster. The recognition server 101 may include data storage 243.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. For example, the client device 115 may include a graphics processor unit (GPU) for handling graphics and multimedia processing. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends a query image to the recognition server 101 and the recognition server 101 provides data in JavaScript Object Notation (JSON) format about one or more items recognized in the query image to the client device 115. The client device 115 may support use of graphical application program interface (API) such as Metal on Apple iOS™ or RenderScript on Android™ for determination of feature location and feature descriptors during image processing.

The grouping application 103 may include software and/or logic to provide the functionality for determining one or more linear groups of horizontally placed items in an image. In some embodiments, the grouping application 103 can be implemented using programmable or specialized hardware, such as a field-programmable gate array (FPGA) or an application-specific integrated circuit (ASIC). In some embodiments, the grouping application 103 can be implemented using a combination of hardware and software. In other embodiments, the grouping application 103 may be stored and executed on a combination of the client devices 115 and the recognition server 101, or by any one of the client devices 115 or recognition server 101.

In some embodiments, the grouping application 103b may be a thin-client application with some functionality executed on the client device 115 and additional functionality executed on the recognition server 101 by grouping application 103a. For example, the grouping application 103b on the client device 115 could include software and/or logic for capturing an image, transmitting the image to the recognition server 101, and displaying image recognition results. In another example, the grouping application 103a on the recognition server 101 could include software and/or logic for receiving the image, stitching the image into a larger composite image based on sufficient overlap with a previously received image and generating image recognition results. In yet another example, the grouping application 103a on the recognition server 101 could include software and/or logic for determining multiple linear groups in the image. The grouping application 103a or 103b may include further functionality described herein, such as, processing the image and performing feature identification.

In some embodiments, the grouping application 103 receives an image including a portion of a shelving unit. As used herein, a shelving unit may be any horizontal arrangement of products (e.g., products on a shelf, hanging products, etc.). The grouping application 103 identifies a plurality of items in the image. The grouping application 103 determines a plurality of facings. The grouping application 103 clusters the plurality of facings. The grouping application 103 merges a plurality of clusters. The grouping application 103 determines a list of linear groups in the image. The operation of the grouping application 103 and the functions listed above are described below in more detail below with reference to FIGS. 3-11.

Figure 2:
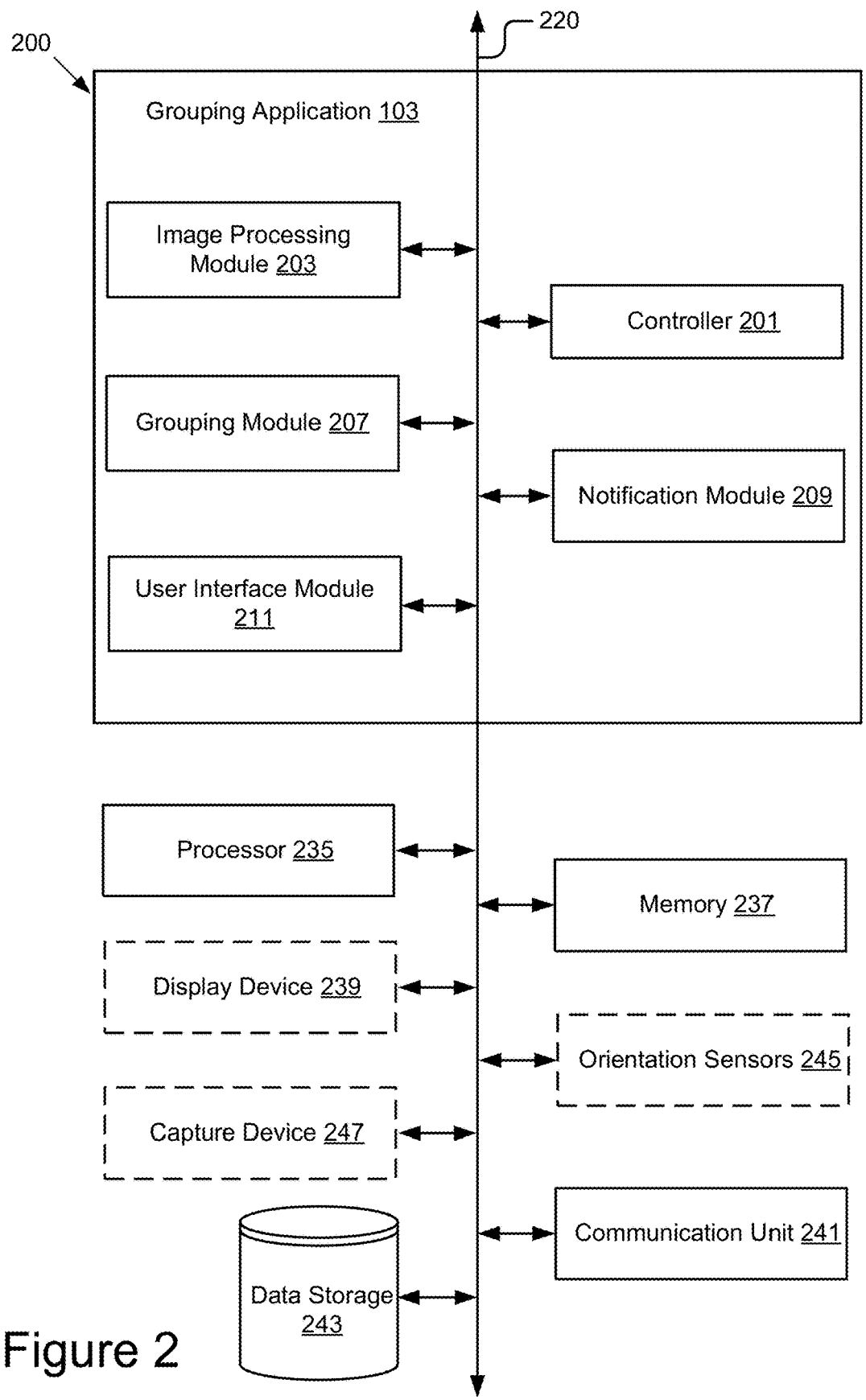
FIG. 2 is a block diagram illustrating one embodiment of a computing device including a grouping application.

FIG. 2 is a block diagram illustrating one embodiment of a computing device 200 including a grouping application 103. The computing device 200 may also include a processor 235, a memory 237, an optional display device 239, a communication unit 241, data storage 243, optional orientation sensors 245 and an optional capture device 247 according to some examples. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be the client device 115, the recognition server 101, or a combination of the client device 115 and the recognition server 101. In such embodiments where the computing device 200 is the client device 115 or the recognition server 101, it should be understood that the client device 115, and the recognition server 101 may include other components described above but not shown in FIG. 2.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the grouping application 103, and the data storage 243. It will be apparent to one skilled in the art that other processors, operating systems, sensors, displays and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the grouping application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, an embedded memory device, a discrete memory device (e.g., a PROM. FPROM, ROM), a hard disk drive, an optical disk drive (CD. DVD. Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, FPROM, ROM), a hard disk drive, an optical disk drive (CD. DVD. Blu-Ray™, etc.). It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images and data as described herein. In different embodiments, the display is binary (only two different values for pixels), monochrome (multiple shades of one color), or allows multiple colors and shades. The display device 239 is coupled to the bus 220 for communication with the processor 235 and the other components of the computing device 200. It should be noted that the display device 239 is shown in FIG. 2 with dashed lines to indicate it is optional. For example, where the computing device 200 is the recognition server 101, the display device 239 is not part of the system, where the computing device 200 is the client device 115, the display device 239 is included and is used to display images and associated recognition results.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image. The communication unit 241 also transmits information including recognition results to the client device 115 for display, for example, in response to processing the image. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for analyzing a received image and results of the analysis and other functionality as described herein. For example, the data storage 243 may store templates for a plurality of stock keeping units for image recognition purposes. A stock keeping unit (SKU) is a distinct item, such as a product offered for sale. The stock keeping unit includes all attributes that makes the item distinguishable as a distinct product from all other items. For example, the attributes include product identifier (Universal Product Code, International Article Number, etc.), product name, dimensions (width, height, depth, etc.), size (liters, gallons, ounces, pounds, kilograms, fluid ounces, etc.), description, brand manufacturer, color, packaging, material, model number, price, discount, base image, etc. The stock keeping unit may also refer to a unique identifier that refers to the particular product or service in the inventory. In some embodiments, the data storage 243 stores a received image and the set of features determined for the received image. In some embodiments, the data storage 243 may similarly store a plurality of linear groups determined for the received image. Additionally, the data storage 243 may store one or more planograms of shelving units in retail stores. The data stored in the data storage 243 is described below in more detail.

The orientation sensors 245 may be hardware-based or software-based, or a combination of hardware and software for determining position or motion of the computing device 200. In some embodiments, the orientation sensors 245 may include an accelerometer, a gyroscope, a proximity sensor, a geomagnetic field sensor, etc. In different embodiments, the orientation sensors 245 may provide acceleration force data for the three coordinate axes, rate of rotation data for the three coordinate axes (e.g., yaw, pitch and roll values), proximity data indicating a distance of an object, etc. It should be noted that the orientation sensors 245 are shown in FIG. 2 with dashed lines to indicate it is optional. For example, where the computing device 200 is the recognition server 101, the orientation sensors 245 are not part of the system, where the computing device 200 is the client device 115, the orientation sensors 245 are included and are used to provide sensor information for various motion or position determination events of the client device 200 described herein.

The capture device 247 may be operable to capture an image or data digitally of an object of interest. For example, the capture device 247 may be a high definition (HD) camera, a regular 2D camera, a multi-spectral camera, a structured light 3D camera, a time-of-flight 3D camera, a stereo camera, a standard smartphone camera or a wearable computing device. The capture device 247 is coupled to the bus to provide the images and other processed metadata to the processor 235, the memory 237 or the data storage 243. It should be noted that the capture device 247 is shown in FIG. 2 with dashed lines to indicate it is optional. For example, where the computing device 200 is the recognition server 101, the capture device 247 is not part of the system, where the computing device 200 is the client device 115, the capture device 247 is included and is used to provide images and other metadata information described below with reference to FIGS. 3 and 4.

In some embodiments, the grouping application 103 may include a controller 201, an image processing module 203, a grouping module 207, a notification module 209 and a user interface module 211. These components 201, 203, 207, 209 and 211 of the grouping application 103 may be communicatively coupled via the bus 220. The components 201, 203, 207, 209 and 211 may each include software and/or logic to provide their respective functionality. In some embodiments, the components 201, 203, 207, 209 and 211 can each be implemented using programmable or specialized hardware including a field-programmable gate array (FPGA) or an application-specific integrated circuit (ASIC). In some embodiments, the components 201, 203, 207, 209 and 211 can each be implemented using a combination of hardware and software executable by processor 235. In some embodiments, the components 201, 203, 207, 209 and 211 may each be a set of instructions executable by the processor 235. In some embodiments, the components 201, 203, 207, 209 and 211 may each be stored in the memory 237 and be accessible and executable by the processor 235. In some embodiments, the components 201, 203, 207, 209 and 211 may each be adapted for cooperation and communication with the processor 235, the memory 237 and other components of the grouping application 103 via the bus 220.

The controller 201 may include software and/or logic to control the operation of the other components of the grouping application 103. The controller 201 controls the other components of the grouping application 103 to perform the methods described below with reference to FIGS. 6-11. The controller 201 may also include software and/or logic to provide the functionality for handling communications between the grouping application 103 and other components of the computing device 200 as well as between the components of the grouping application 103.

In some embodiments, the controller 201 sends and receives data, via the communication unit 241, to and from one or more of the client device 115 and the recognition server 101. For example, the controller 201 receives, via the communication unit 241, an image from a client device 115 operated by a user and sends the image to the image processing module 203. In another example, the controller 201 receives data for providing a graphical user interface to a user from the user interface module 211 and sends the data to a client device 115, causing the client device 115 to present the user interface to the user.

In some embodiments, the controller 201 receives data from other components of the grouping application 103 and stores the data in the data storage 243. For example, the controller 201 receives data including feature points identified in a received image from the image processing module 203 and stores the data in the data storage 243. In other embodiments, the controller 201 retrieves data from the data storage 243 and sends the data to other components of the grouping application 103. For example, the controller 201 retrieves data including a list of recognition results for a recognized item in the received image from the data storage 243 and sends the retrieved data to the grouping module 207.

In some embodiments, the communications between the grouping application 103 and other components of the computing device 200 as well as between the components of the grouping application 103 can occur autonomously and independent of the controller 201.

The image processing module 203 may include software and/or logic to provide the functionality for receiving and processing one or more images of a scene with objects of interest from the client device 115. For example, the scene can be a shelving unit, a region, an artwork, a landmark, a scenic location, outer space, etc. In some embodiments, the image processing module 203 receives an image including a portion of a shelving unit from the client device 115. In some embodiments, the image processing module 203 receives an image for recognition and the image may include multiple items of interest. An item of interest can be a trade item. For example, the image can be a realogram image of packaged products on a shelving unit (e.g., coffee packages, breakfast cereal boxes, soda bottles, etc.) which reflects the real situation on the shelves in a retail store. A packaged product of a brand manufacturer may include textual and pictorial information printed on its surface that distinguishes it from packaged products belonging to one or more other brand manufacturers. The packaged products may also sit in an orientation on the shelf exposed to the user looking at the shelf. For example, a box-like packaged product might be oriented with the front of the product exposed to the user looking at the shelf. In some embodiments, the image processing module 203 determines whether successful recognition is likely on the received image and instructs the user interface module 211 to generate graphical data including instructions for the user to retake the image if a section of the image captured by the client device 115 has limited information for complete recognition (e.g., a feature rich portion is cut off), the image is too blurry, the image has an illumination artifact (e.g., excessive reflection), etc.

In some embodiments, the image processing module 203 may process one or more images serially or in parallel. The image processing module 203 determines a set of features (i.e., feature points) of a received image. For example, the image processing module 203 may determine a location, an orientation, and an image descriptor for each feature point identified in the received image. In some embodiments, the image processing module 203 uses corner detection algorithms for determining feature location. For example, the corner detection algorithms can include Shi-Tomasi corner detection algorithm, Harris and Stephens corner detection algorithm, etc. In some embodiments, the image processing module 203 uses feature finding and description algorithms for determining efficient image feature descriptors. For example, the features description algorithms may include Binary Robust Independent Elementary Features (BRIEF), Scale-Invariant Feature Transform (SIFT), Speeded Up Robust Features (SURF), Binary Robust Invariant Scalable Keypoints (BRISK) algorithm, Fast Retina Keypoint (FREAK) algorithm, Oriented FAST and Rotated BRIEF (ORB) algorithm, etc. An image descriptor of a feature may be a 256-bit bitmask which describes the image sub-region covered by the feature. In some embodiments, the image processing module 203 may compare each pair of 256 pixel pairs near the feature for intensity and based on each comparison, the feature extraction module 203 may set or clear one bit in the 256-bit bitmask.

Figure 3A:
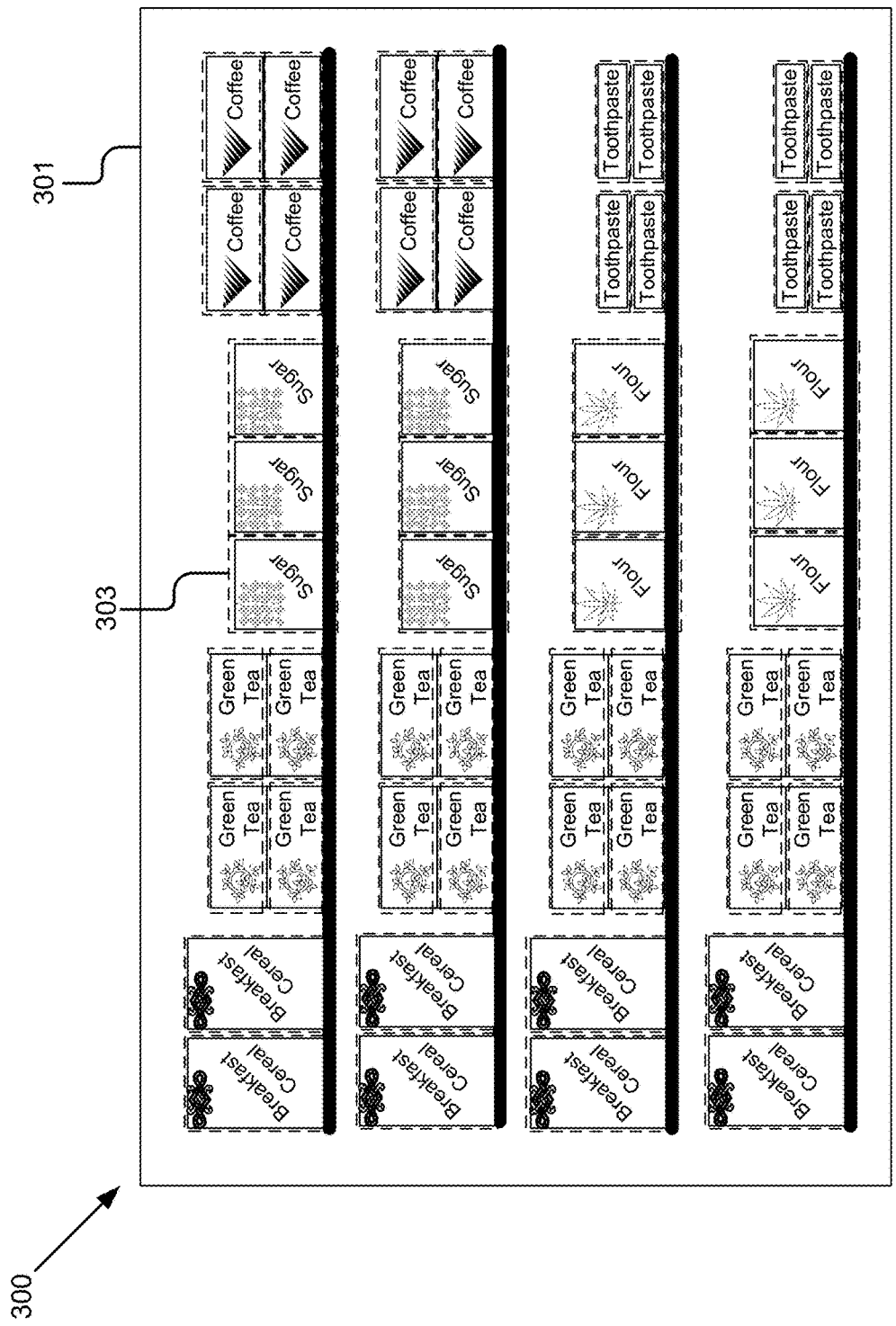
FIGS. 3A-3C are graphical representations of embodiments of a process for identifying a plurality of items in an image.
Figure 3B:
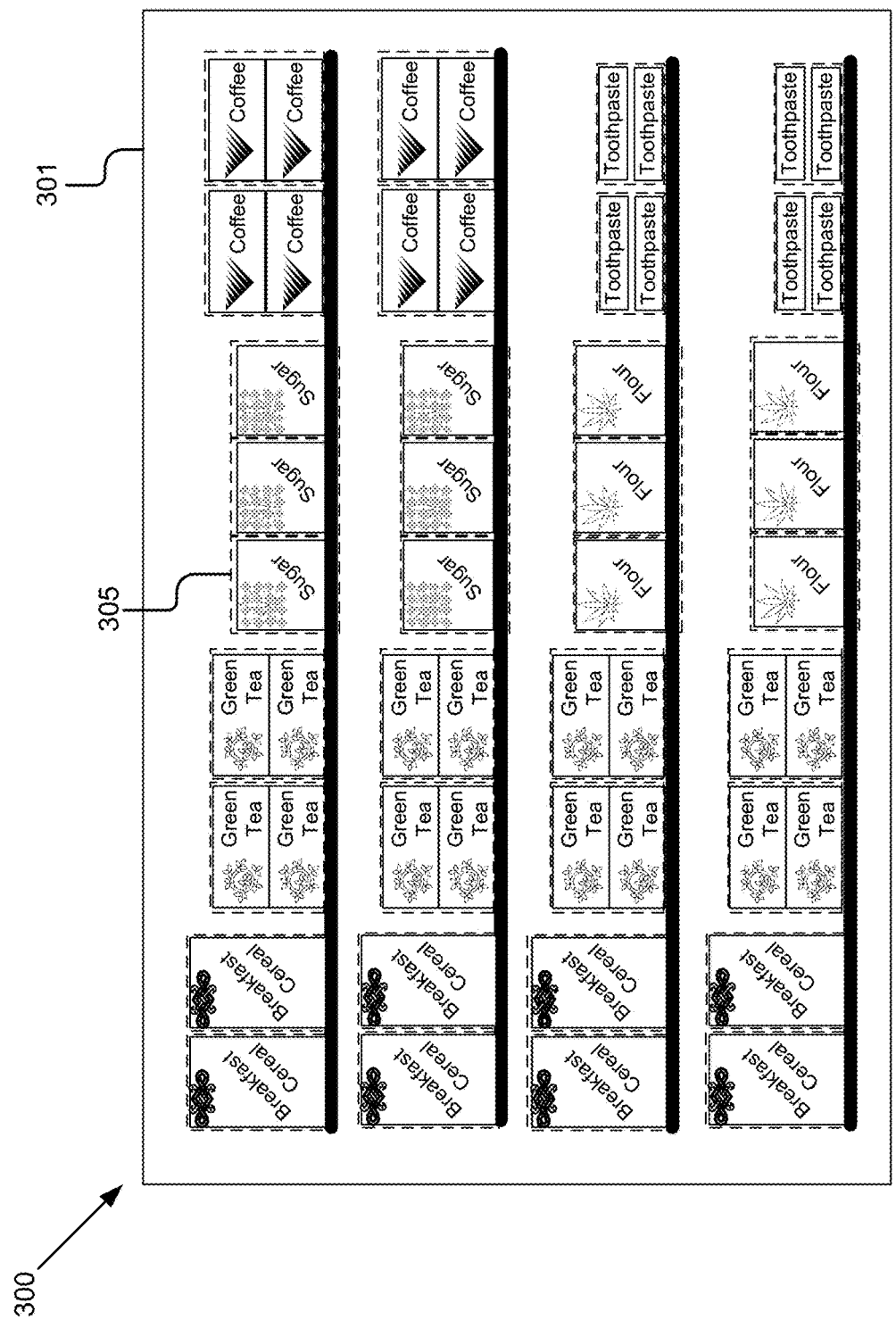
Figure 3C:
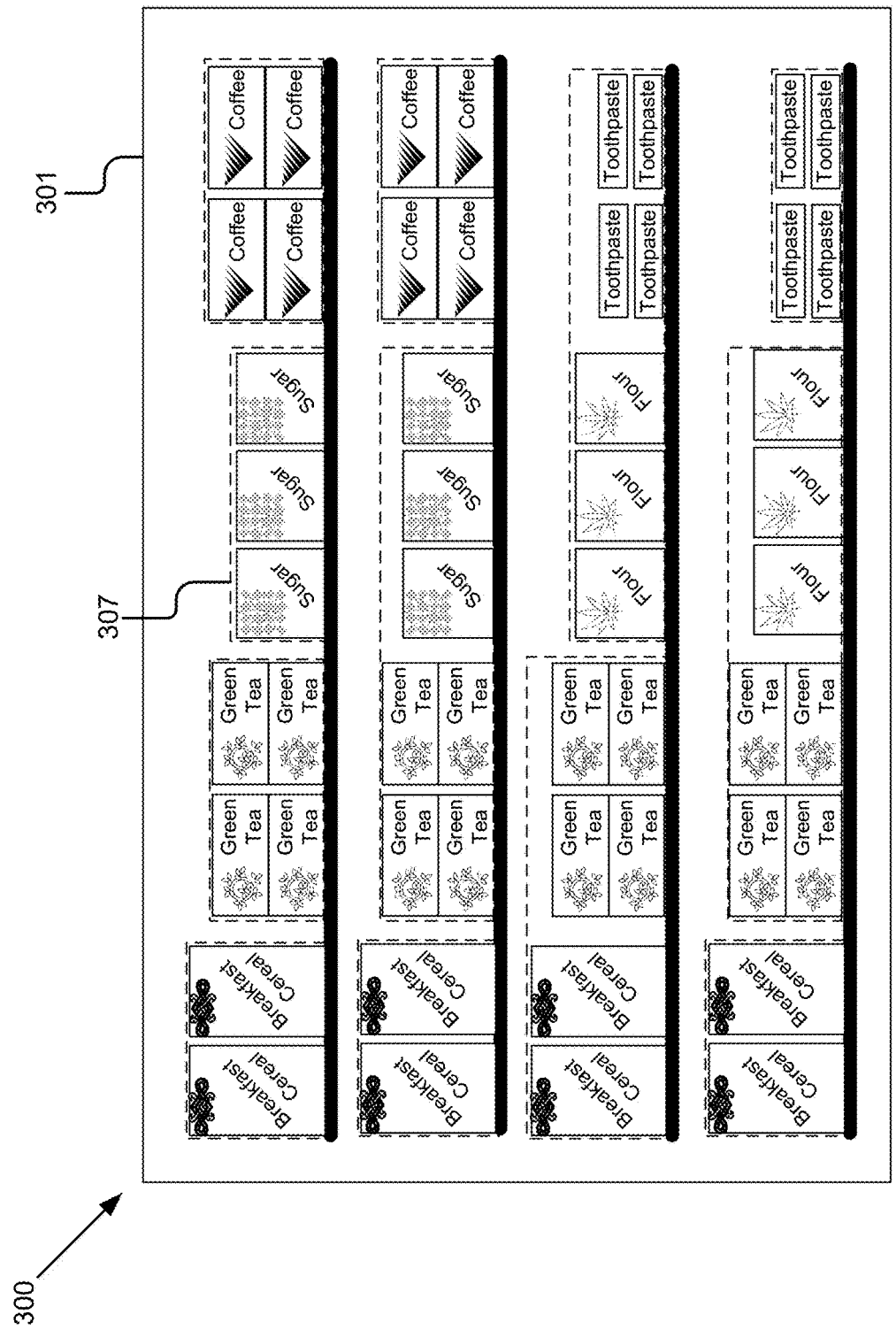

In some embodiments, the image processing module 203 matches the features of the received image with the features of templates stored for a plurality of items in the data storage 243 to recognize items in the received image. In some embodiments, the image processing module 203 identifies a region of interest (ROI) bordering the recognized items in the received image. A region of interest can be of any shape, for example, a polygon, a circle with a center point and a diameter, a rectangular shape of a width, a height and one or more reference points for the region (e.g., a center point, one or more corner points for the region), etc. For example, the region of interest may border the matched item in its entirety. In another example, the region of interest may border the exposed labeling containing pictorial and textual information associated with the matched item. In some embodiments, the image processing module 203 generates a list of recognition results applicable to each of the recognized items in the received image. For example, the image features of a toothpaste box-like packaged item may match the Universal Product Codes (UPCs) for toothpaste brand 'X,' toothpaste brand 'Y,' and toothpaste brand 'Z' with varying confidence scores. In FIG. 3A, the graphical representation 300 includes an image 301 including a shelving unit. The shelving unit is stocked with consumer packaged products. In some embodiments, the image processing module 203 identifies the plurality of products with a region of interest 303 (shown as a dashed line) bordering each of the plurality of products in the image 301. In some embodiments, as shown in the example of FIG. 3B, the grouping module 207 identifies facings 305 (shown surrounded by a dashed line) in the image 301. In some embodiments, as shown in the example of FIG. 3C, the grouping module 207 identifies clusters 307 (shown surrounded by a dashed line) in the image 301.

In some embodiments, the image processing module 203 receives a series of images of a shelving unit that are overlapping with each other by a certain threshold. For example, an overlap threshold can be set at approximately 50-60 percent between the images. For purposes of creating a linear composite panoramic image using a series of images, the user may move the client device 115 in any direction along the object of interest while remaining parallel to the shelving unit for capturing the series of images that are adjacent to each other. For example, the user carrying the client device 115 can move in a north, south, east, or west direction from one point of location to another while remaining parallel to the shelving unit for capturing the series of overlapping images. In some embodiments, the image processing module 203 stitches the series of images into a single linear panoramic image (e.g., a composite image) based on data including the overlap information and associated recognition results for each of the individual images in the series. In some embodiments, the image processing module 203 stitches the series of images into the panoramic image, determines the features of the panoramic image and matches the determined features with the features of templates stored for a plurality of items in the data storage 243 to recognize items in the panoramic image.

In some embodiments, the image processing module 203 sends the data including recognition results for items recognized in the received image to the grouping module 207. In other embodiments, the image processing module 203 stores the data including recognition results for the received image in the data storage 243.

In some embodiments, grouping module 207 groups items into facings and/or facings into clusters as described below with reference to FIG. 6. In some embodiments, the grouping module 207 stores the data including facings and clusters determined in the received image in the data storage 243.

The grouping module 207 may include software and/or logic to provide the functionality for creating multiple linear groups of identified items in the received image. A linear group can be a horizontal collection of identified items placed on a shelf or hanging from pegs. For example, a linear group can be a shelf in the shelving unit. In some embodiments, the grouping module 207 generates multiple linear groups without using a planogram. In some embodiments, the grouping module 207 receives information including a plurality of clusters of facings in the received image from the grouping module 207 and combines the clusters to create multiple linear groups. Some embodiments are described below with reference to FIG. 7.

In some embodiments, the grouping module 207 identifies and retrieves a planogram corresponding to the shelving unit in the received image from the data storage 243. Some embodiments are described below with reference to FIG. 8. For example, the planogram can be associated with consumer packaged goods firm that produce the items in the image of the shelving unit. Typically, a planogram image includes attributes, such as perfect image (no capture noise), perfect image alignment, identical items in a facing and perfect image recognition. One embodiment of using contextual information from a planogram for grouping is described below with reference to FIG. 9.

A second embodiment of using contextual information from a planogram for determining a list of linear groups is described herein and below with respect to FIG. 10. In some embodiments, the grouping module 207 aligns the planogram globally with the identified items in the received image. The grouping module 207 identifies a plurality of clusters in the received image from the grouping module 207. The grouping module 207 determines a similarity of items in the cluster and each of the one or more linear groups. The grouping module 207 determines a distance of the cluster to each of the one or more linear groups based on the similarity. The grouping module 207 assigns the cluster to a nearest linear group of the one or more linear groups. In some embodiments, the grouping module 207 collects the linear groups into a second list of candidate linear groups. In some embodiments, the grouping module 207 compares scores from candidate linear groups as described below with respect to FIG. 11.

In some embodiments, the grouping module 207 sends data including the list of linear groups determined for the received image to the notification module 209. In other embodiments, the grouping module 207 stores the data including the list of linear groups in the data storage 243.

The notification module 209 may include software and/or logic to provide the functionality for generating a notification associated with a status of the shelving unit in the received image. In some embodiments, the notification module 209 receives the list of linear groups determined for the received image from the grouping module 207. The notification module 209 compares the list of linear groups with the contextual information of the planogram of the shelving unit in the received image and generates a report on the status of the shelving unit. In some embodiments, the notification module 209 determines whether the positioning of items in the shelving unit are complaint with the planogram. The notification module 209 generates a notification to send to the client device 115. For example, the notification module 209 determines that a product is misplaced on the shelving unit, a product is missing on the shelf or a whole shelf of products is missing in the received image. The notification module 209 generates a notification recommending corrective actions to rectify the product placement on the shelving unit and sends the notification to the client device 115 for a representative at the retail store to follow the recommendation. In some embodiments, the notification module 209 sends data including instructions to the user interface module 211 to generate and display the notification on the user interface of the client device 115.

The user interface module 211 may include software and/or logic for providing user interfaces to a user. In some embodiments, the user interface module 211 receives instructions from the image processing module 203 to generate a graphical user interface on the display of the client device 115 on how to move the client device 115 in capturing images. In some embodiments, the user interface module 211 receives instructions from the notification module 209 to generate a graphical user interface that displays the notification. In other embodiments, the user interface module 211 sends graphical user interface data to an application (e.g., a browser) in the client device 115 via the communication unit 241 causing the application to display the data as a graphical user interface.

Figure 6:
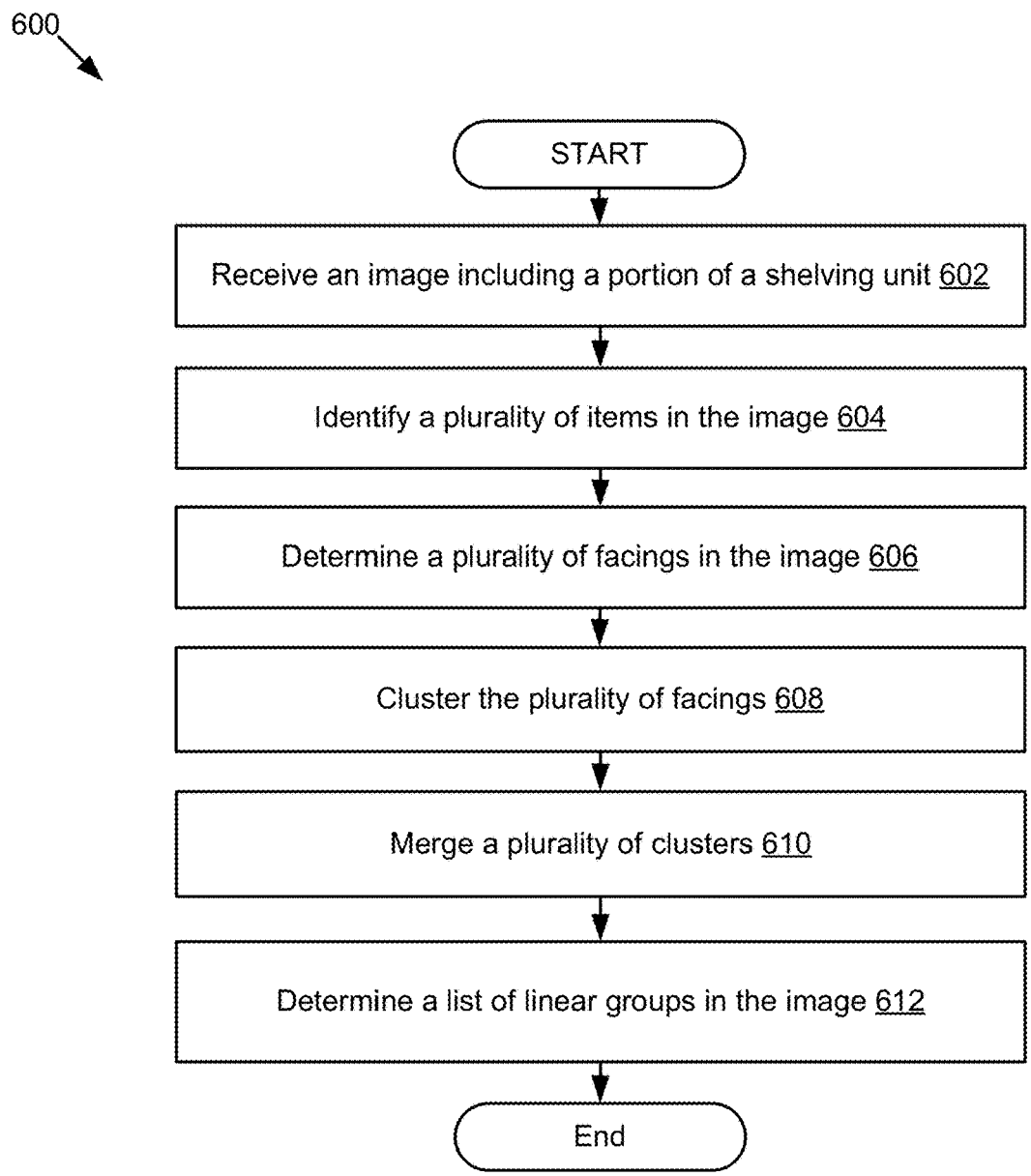
FIG. 6 is a flow diagram illustrating one embodiment of a method for determining a list of linear groups in an image.

FIG. 6 is a flow diagram illustrating one embodiment of a method 600 for determining a list of linear groups in an image. At 602, the image processing module 203 receives an image including a portion of a shelving unit. At 604, the image processing module 203 identifies a plurality of items in the image. At 606, the grouping module 207 determines a plurality of facings in the image. In some embodiments, the grouping module 207 determines a plurality of facings in the received image. Typically, a facing may be a vertical stacking of more than two items on a shelf turned out towards the customer in a retail store. For example, a set of four toothpaste products, each in a box-like package may be stacked on top of one another to form a facing at a single position of the shelf. In some embodiments, the grouping module 207 determines a bounding box for facings identified in the image. The bounding box includes a description of X-Y coordinate location, a height and width of the facing, UPCs of items associated with the facing, etc.

In some embodiments, the grouping module 207 determines dimensions for the plurality of recognized items in the received image. For example, the grouping module 207 determines the dimensions, in pixels, of the region of interest bordering a recognized item in the received image. In another example, the grouping module 207 determines the physical dimensions from the recognition result retrieved for the matched item in the received image. In some embodiments, the grouping module 207 determines whether the items in the image are part of a facing based on comparing the horizontal dimensions and the vertical dimensions of the items. The grouping module 207 determines whether the horizontal dimension of items is larger than the vertical dimension of items to be part of a facing. For example, products with larger vertical dimension cannot be stacked and thus cannot be part of the facing. In some embodiments, the grouping module 207 determines whether the items are vertically close to each other to be part of the facing. For example, the grouping module 207 determines whether products placed one on top of the other are vertically close within 30 percent of the height of the bottom most product to be part of the facing. In some embodiments, the grouping module 207 determines whether the items have a horizontal overlap to be part of the facing. For example, the grouping module 207 determines whether the products placed one on top of the other have at least 70 percent horizontal overlap with each other to be part of the facing. In another embodiment, the grouping module 207 determines whether the products placed one on top of the other have at least a horizontal overlap that is determined from parameters of a statistical distribution characterizing the horizontal overlap of products in facings (e.g., from the mean and standard deviation of the distribution of horizontal overlap in facings). This distribution can be determined for all products that are expected to appear on the shelving unit or for a selected subgroup (e.g., a specific brand) of products.

Typically, items stacked on top of each other in a facing are similar. In some embodiments, the grouping module 207 determines whether items placed stacked on top of each other are similar items to be part of the facing. In some embodiments, the grouping module 207 determines similarity of each pair of items in the facing based on cosine similarity. The cosine similarity is computed between two vectors, where for a given vector its components contain values representing the quality of a match of a particular item to other items in a list of possible matching items. The grouping module 207 retrieves a list of recognition results for each item in a pair of items being tested for similarity and determines a length of the list of recognition results. For example, a first list of recognition results for one item of the pair might include Universal Product Codes represented by A, B and C as possible matches and a second list of recognition results for another item of the pair might include Universal Product Codes represented by B, D and E as possible matches. The grouping module 207 determines the length of first and the second lists of recognition results to be three. In some embodiments, the grouping module 207 determines a count of matching recognition results in the lists of recognition results for the pair of items. For example, the grouping module 207 determines a count of matching Universal Product Codes between the first and the second list of recognition results for the pair of items to be one (i.e., B is the one matching UPC). In some embodiments, the grouping module 207 determines a similarity score by dividing the count of the matching recognition results by the geometric mean of the lengths of the two recognition lists. The similarity score has a range between a minimum of zero and a maximum of one. In some embodiments, the grouping module 207 determines whether the similarity score satisfies a threshold. The grouping module 207 determines the pair of items as similar based on the similarity score satisfying the threshold. The grouping module 207 determines the pair of items as not similar based on the similarity score being zero. In some embodiments, the grouping module 207 categorizes a facing as an incorrect facing based on a pair of items in the facing being not similar.

At 608, the grouping module 207 clusters the plurality of facings. In some embodiments, the grouping module 207 determines whether items in the adjacent facings are situated within a threshold horizontal distance for clustering the adjacent facings. For example, the grouping module 207 determines whether items in adjacent facings are positioned horizontally within a distance equal to four times the maximum dimension for a product identified in either of the adjacent facings. The threshold horizontal distance can also be calculated from a statistical analysis of the distribution of horizontal product dimensions. For example, the threshold horizontal distance can be set as the (mean+3-sigma standard deviation) of the horizontal product dimension distribution. The horizontal product dimension distribution can be estimated using all products represented in a product data base that are expected to be placed on a shelf or restricted to products of a certain brand. The grouping module 207 clusters the facings together if the threshold horizontal distance between the facings is satisfied. In some embodiments, the grouping module 207 determines whether the items in the facings have a vertical overlap to be part of the cluster. For example, the grouping module 207 determines whether the facings have at least 60 percent vertical overlap with each other to be clustered together. In some embodiments, the grouping module 207 determines whether a baseline (bottom edge of a group of items on a shelf in the image) is varying for clustering the facings. For example, if the baseline varies by more than 0.6 times the minimum dimension for the product identified in the facings to be clustered, the grouping module 207 does not cluster the facings. In another embodiment, information about location of shelf boards in the image may be used. For example, if the distance of the baseline to the shelf board below the baseline is larger than a threshold, the facings will not be clustered. The shelf board distance can be set to be multiple of the vertical height of the baseline product or set to be a statistical parameter extracted from the distribution of baseline distances in a shelf scene.

At 610, the grouping module 207 merges a plurality of clusters. In some embodiments, the grouping module 207 determines a height for all the clusters. The grouping module 207 determines $80^{th}$ percentile height of the heights determined for all the clusters and multiplies the $80^{th}$ percentile height by 1.75 to generate a threshold height. The percentile height can be replaced by a value extracted from the statistical distribution of the product heights in the image or in specific clusters. For example, the percentile height can be replaced by the mean+2-sigma value of the product height distribution. The grouping module 207 determines whether merging a plurality of clusters results in a linear group with a height greater than the threshold height. The grouping module 207 does not merge the clusters to form the linear group if the height of the resulting linear group is greater than the threshold height.

In some embodiments, the grouping module 207 determines whether merging clusters results in the linear group having incorrect facings. The items in a facing are designed to represent an identical product (or same SKUs). However, if the items get misplaced on the shelving unit, the facing may become an incorrect facing. In addition, an incorrect facing may be because there is too large a vertical gap within a facing. The vertical gap may be present due the items being further at the back of the shelf (e.g., products would appear to be floating in the image). In some embodiments, the grouping module 207 determines whether merging clusters results in a linear group with incorrect facings that exceed a threshold. For example, if more than 30 percent of the facings are incorrect, the grouping module 207 does not merge the clusters to form a linear group. In some embodiments, the grouping module 207 merges single items with other clusters in the image. For example, the lowest product in a facing stack is often the only product left in the facing on the shelf when the customers pick off the ones on the top and then the lowest product becomes part of an incorrect facing. However, the grouping module 207 merges the product with other clusters. In some embodiments, the grouping module 207 determines a bounding box for each linear group in the received image. The bounding box for the linear groups includes a description of X-Y coordinate location, a height and width of the linear group, bounding boxes of the plurality of facings, etc.

In one embodiment, the grouping module does not assign identified incorrect facings to a linear group, but collects them in a set. This set of incorrect facings may be displayed to a user for further inspection or might not be suppressed in a final visualization.

Figure 4:
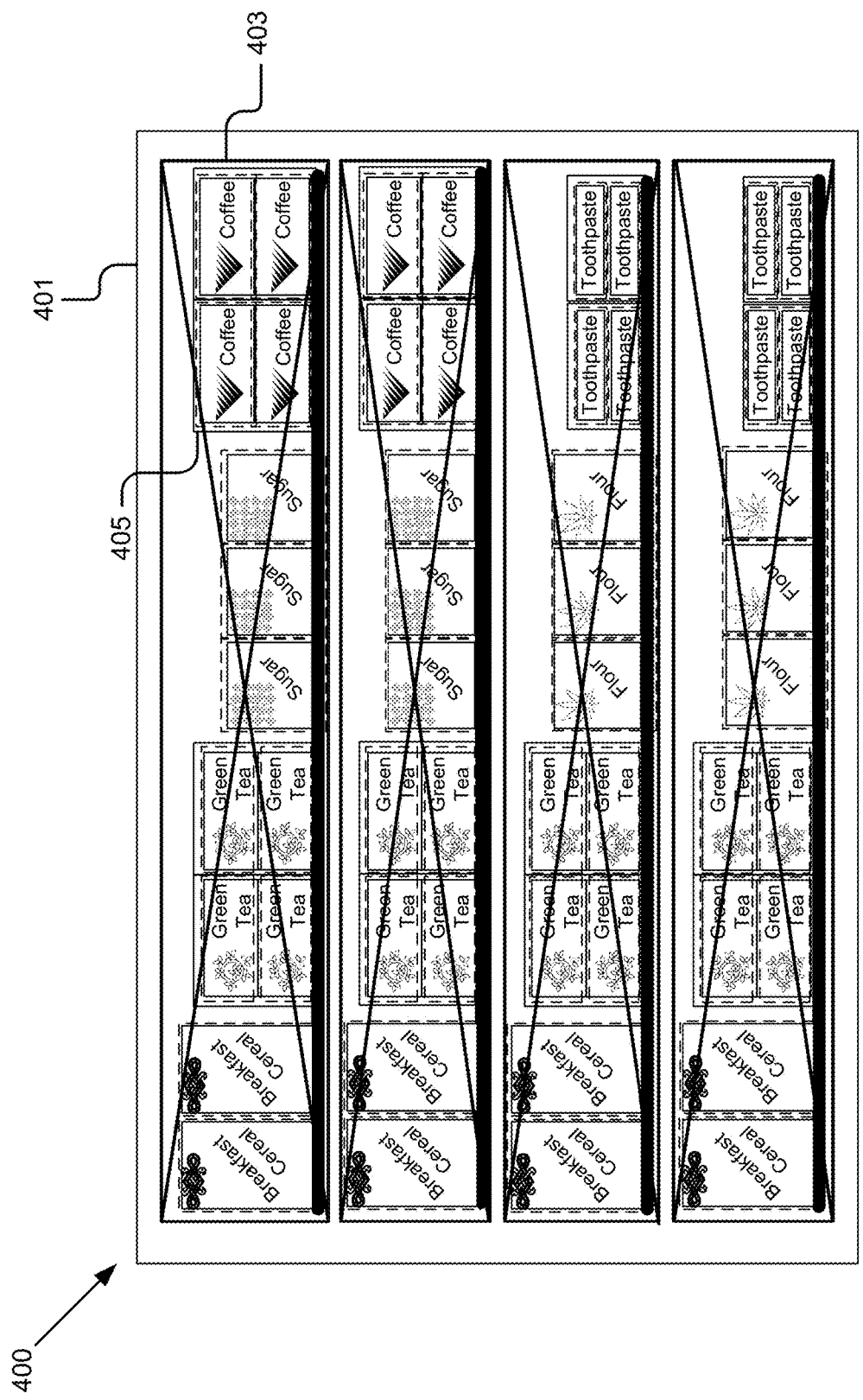
FIG. 4 is a graphical representation of one embodiment of grouping process for determining a list of linear groups in an image.

At 612, the grouping module 207 determines a list of linear groups in the image. In some embodiments, the grouping module 207 determines that the plurality of facings and linear groups may not be in a desired order. The grouping module 207 sorts the plurality of linear groups vertically and the plurality of facings in each linear group horizontally. For example, the grouping module 207 sorts the plurality of linear groups from top to bottom by ascending Y coordinates (assuming that Y=0 is at the top) of the bounding box for the linear groups or alternatively from bottom to top by descending Y coordinates. In another example, the grouping module 207 sorts the plurality of facings in each linear group from left to right by ascending X coordinates (assuming that X=0 is on the left) of the bounding box for the facings or alternatively from right to left by descending X coordinates. It can be understood that the grouping module 207 may also sort the plurality of facings and linear groups by the center coordinates, X+(width/2) or Y+(height/2) respectively. As shown in the example of FIG. 4, the graphical representation 400 illustrates one embodiment of grouping process for determining a list of linear groups in an image. In FIG. 4, the graphical representation 400 includes an image 401 including a shelving unit. In some embodiments, the grouping module 207 determines a bounding box 403 for a plurality of linear groups in the image 401. Each bounding box 403 of a linear group includes a horizontal collection of facings. In some embodiments, the grouping module 207 determines a bounding box 405 for a plurality of facings.

In some embodiments, grouping module 207 uses the result of shelf detection to group items into facings. Items are assigned to the same facing if they are above the same shelf and the items have horizontal overlap. In some embodiments, grouping module 207 uses the result of shelf detection to group facings into clusters. Facings are assigned to the same cluster if they are above the same shelf. In some embodiments, items are assigned to facings and/or facings are assigned to clusters additionally based on if the vertical distance between the top of the detected shelf and the bottom of the item or facing meets a criteria such as being smaller than the expected spacing between shelves. The use of this vertical distance handles the case where shelf detection makes an error and does not detect a shelf (a false negative).

Figure 7:
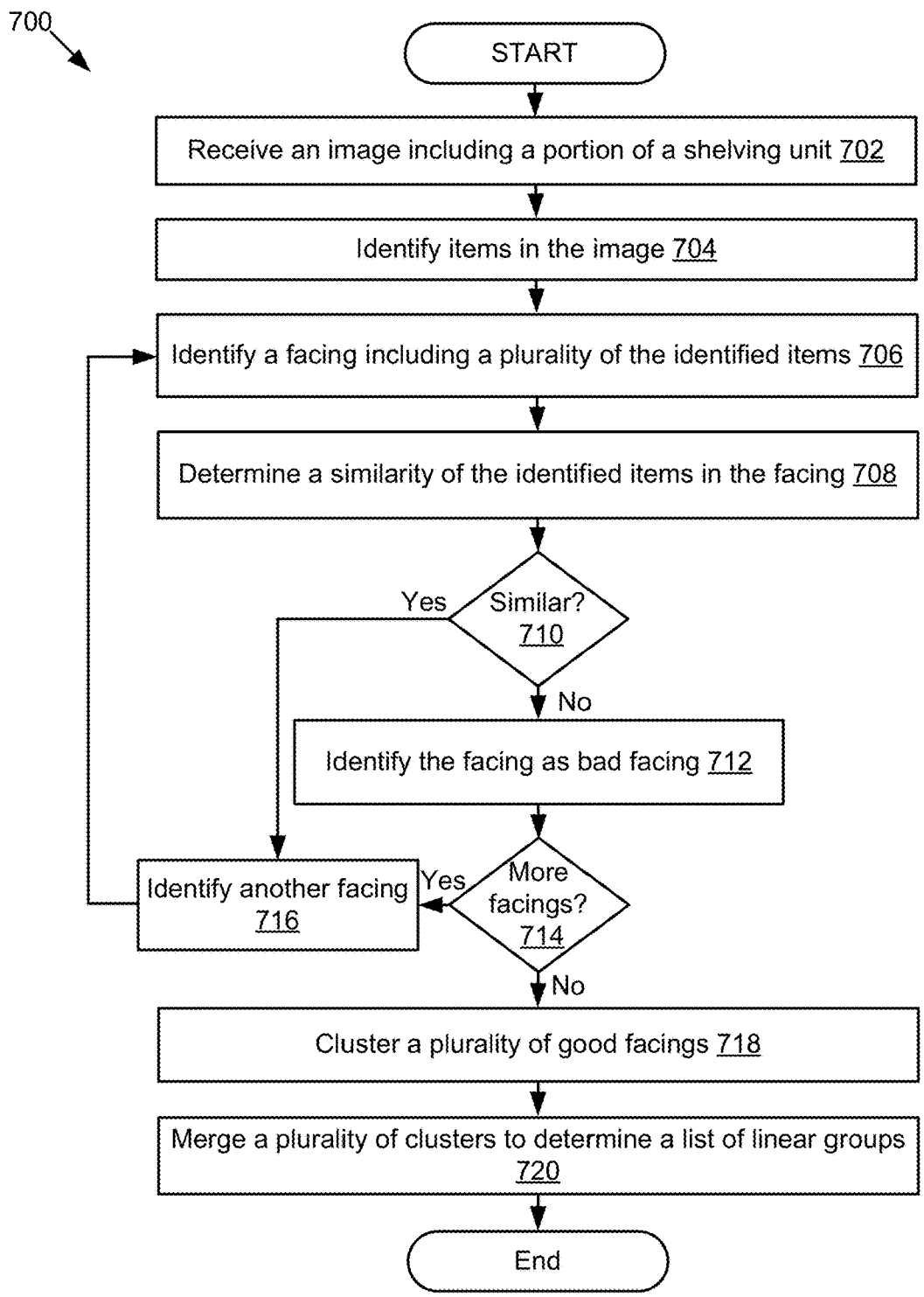
FIG. 7 is a flow diagram illustrating one embodiment of a method for determining a list of linear groups in an image without using a planogram.

FIG. 7 are flow diagrams illustrating one embodiment of a method 700 for determining a list of linear groups in an image without using a planogram. At 702, the image processing module 203 receives an image including a portion of a shelving unit. At 704, the image processing module 203 identifies items in the image. At 706, the grouping module 207 identifies a facing including a plurality of the identified items. At 708, the grouping module 207 determines a similarity of the identified items in the facing. At 710, the grouping module 207 determines whether the identified items in the facing are similar. If the items are similar, at 716, the grouping module 207 identifies another facing and the method 700 repeats from step 706. If the items are not similar, at 712, the grouping module 207 identifies the facing as an incorrect facing. At 714, the grouping module 207 determines whether there are more facings in the image. If there are more facings, at 716, the grouping module 207 identifies another facing and the method 700 repeats from step 706. If there are no more facings, at 718, the grouping module 207 clusters the plurality of good facings. At 720, the grouping module 207 merges a plurality of clusters to determine a list of linear groups.

Figure 8:
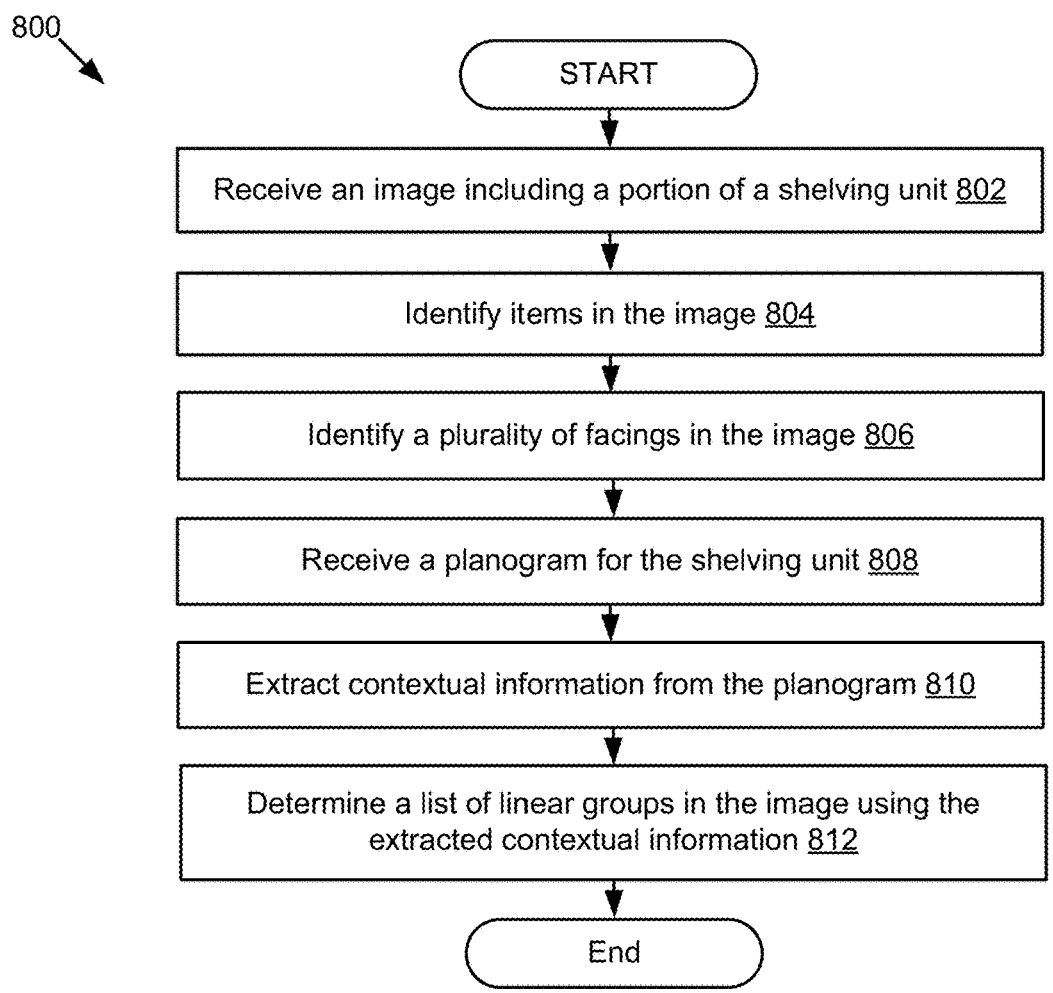
FIG. 8 is a flow diagram illustrating one embodiment of a method for determining a list of linear groups in an image using contextual information of a planogram.

FIG. 8 is a flow diagram illustrating one embodiment of a method 800 for determining a list of linear groups in an image using contextual information of a planogram. At 802, the image processing module 203 receives an image including a portion of a shelving unit. At 804, the image processing module 203 identifies items in the image. At 806, the grouping module 207 identifies a plurality of facings in the image. At 808, the grouping module 207 receives a planogram for the shelving unit. At 810, the grouping module 207 extracts contextual information from the planogram. In some embodiments, the grouping module 207 generates contextual information including facings and linear groups for the planogram. In some embodiments, the contextual information includes position information and identification information. The grouping module 207 groups identical items in the planogram with same left and right edges with no more than a few pixels of vertical space between them into a facing. The grouping module 207 collects adjacent facings with perfectly aligned bottom edges in the planogram into a linear group. For example, the grouping module 27 generates a JSON file including a bounding box for each linear group, a bounding box for each facing and one product in each facing with a Universal Product Code from the planogram. At 812, the grouping module 207 determines a list of linear groups in the image using the extracted contextual information. In some embodiments, the grouping module 207 uses the contextual information of the planogram for generating multiple linear groups in the received image. This use of contextual information from the planogram improves the assignment of identified items in the received image to the right linear group when there are a large number of linear groups, very long shelves in the shelving unit or when the linear groups change partway along in the received image. In some embodiments, the grouping module 207 may identify multiple missing facings and/or missing linear groups in the received image based on the contextual information of the planogram. For example, there can be a large gap in the received image if items are picked up by customers from a portion of shelving unit. The grouping module 207 can identify that multiple facings are missing and/or an entire linear group is missing in the received image based on the contextual information.

Figure 5:
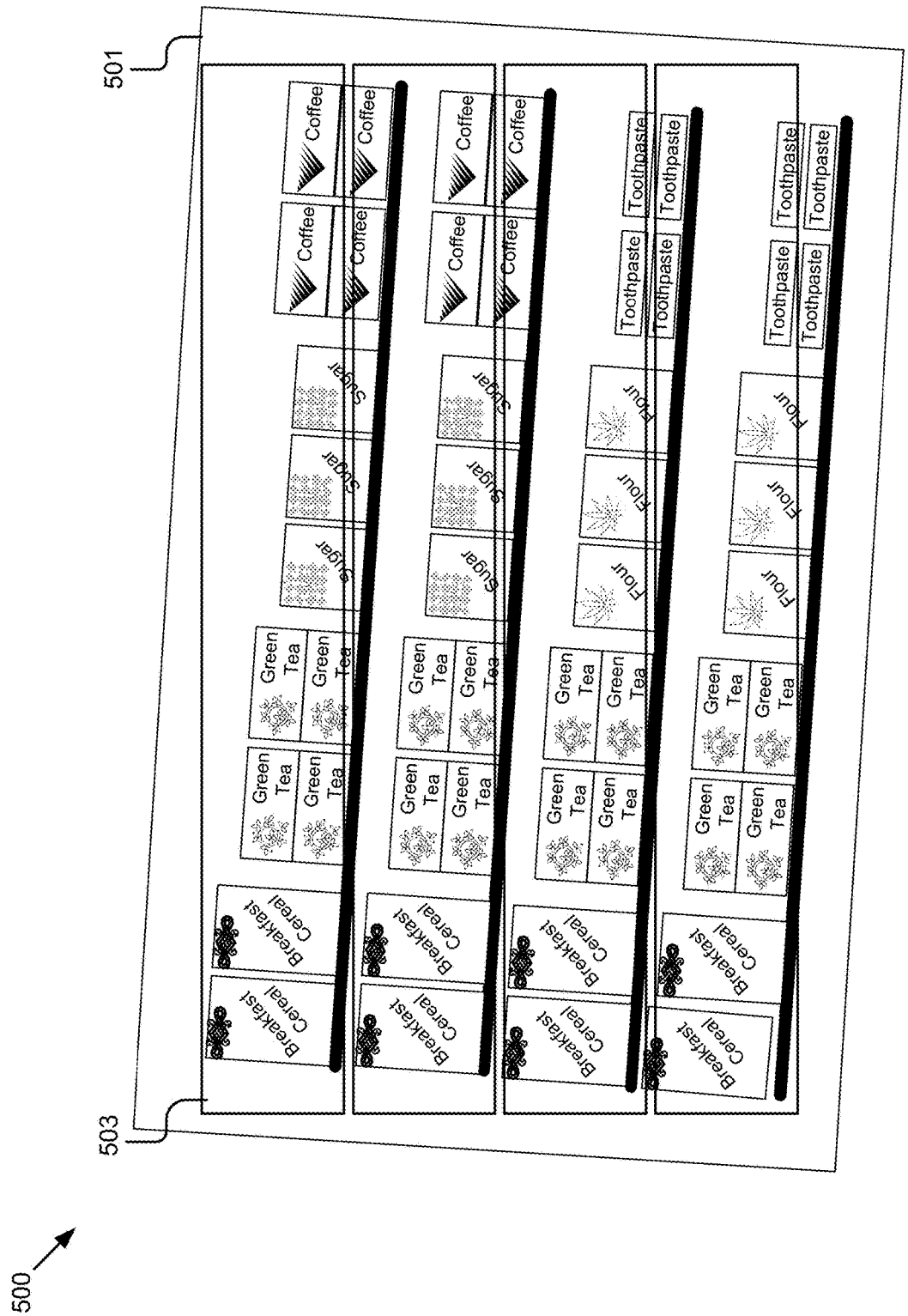
FIG. 5 is a graphical representation of one embodiment of an alignment of planogram contextual information with an image including a shelving unit.
Figure 9:
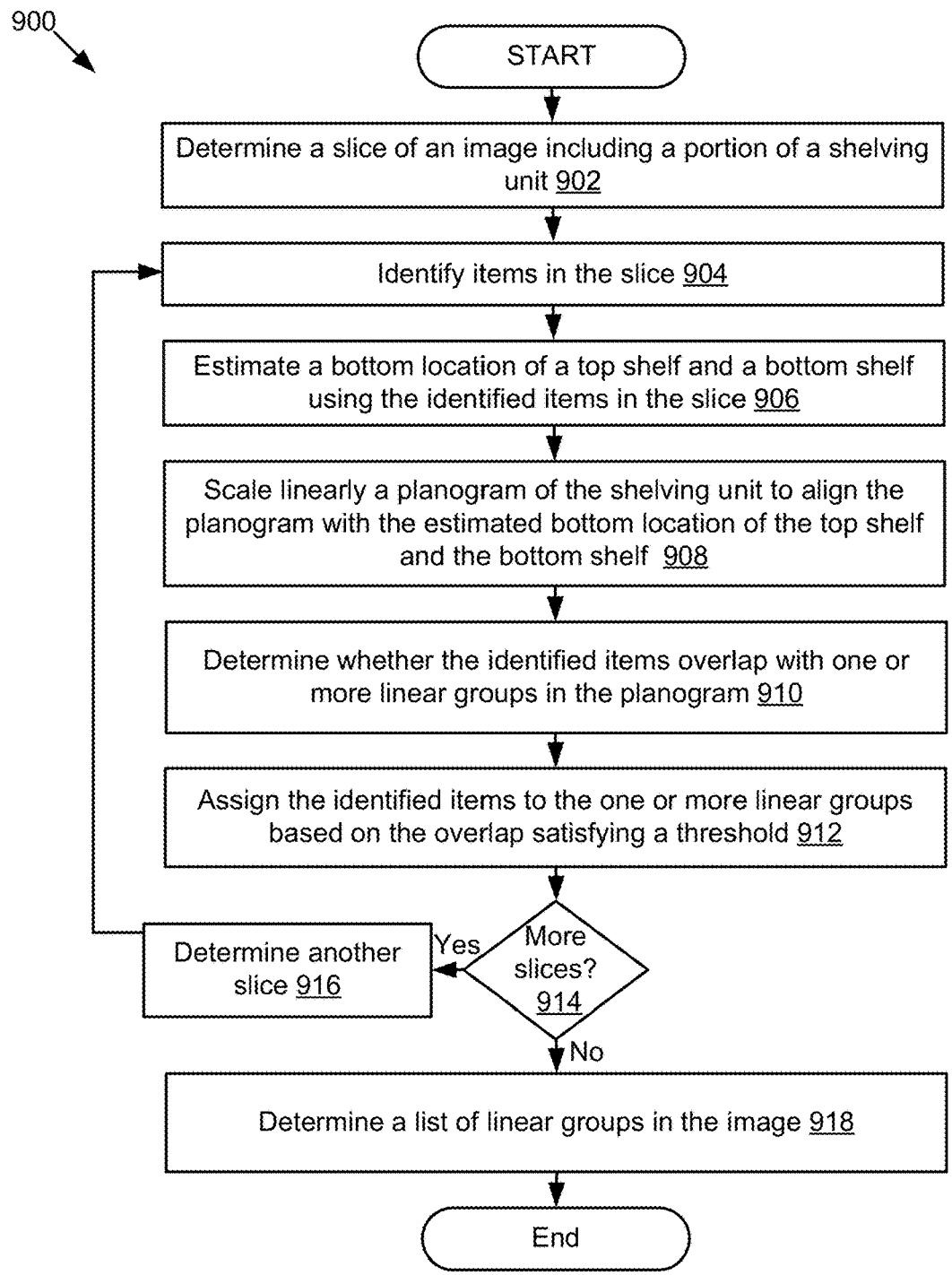
FIG. 9 is a flow diagram illustrating one embodiment of a method for determining a list of linear groups in an image including a shelving unit using a planogram of the shelving unit.

FIG. 9 is a flow diagram illustrating another embodiment of a method 900 for determining a list of linear groups in an image including a shelving unit using a planogram of the shelving unit. At 902, the grouping module 207 determines a slice of an image including a portion of a shelving unit. In some embodiments, the grouping module 207 divides the received image into a plurality of slices. For example, the grouping module 207 divides the received image into five vertical slices. A division of the received image into horizontal slices is also possible. The slices are determined by geometric properties of the shelving unit, by the system architecture of the software implementation of the grouping module, or by semantic information associated with products, such as brand. At 904, the grouping module 207 identifies items in the slice. For example, each vertical slice includes a plurality of identified items. At 906, the grouping module 207 estimates a bottom location of a top shelf and a bottom shelf using the identified items in the slice. The grouping module 207 independently aligns each slice of the received image with the planogram by performing a series of alignment steps as described herein. In some embodiments, the grouping module 207 estimates a bottom location of a top shelf and a bottom shelf using the identified items in a vertical slice of the received image. Some other selection of a pair of shelves is also possible. For example, the grouping module 207 may estimate a bottom location of a pair of shelves other than the top shelf and the bottom shelf to align the planogram with the vertical slice. At 908, the grouping module 207 scales a planogram of the shelving unit to align the planogram with the estimated bottom location of the top shelf and the bottom shelf. In one embodiment, the scaling is linear. At 910, the grouping module 207 determines whether the identified items overlap with one or more linear groups in the planogram. At 912, the grouping module 207 assigns the identified items to the one or more linear groups based on criteria. In one embodiment, a first criteria is if the overlap satisfying a threshold. For example, the grouping module 207 determines whether an item in a vertical slice of the received image overlaps with a linear group in a planogram by 90 percent or more and assigns the item to the linear group. In another example, the grouping module 207 determines whether an item with a vertical dimension (height) greater than a horizontal dimension (width) overlaps with a linear group by 60 percent or more and assign the item to the linear group. As shown in the example of FIG. 5, the graphical representation 500 illustrates one embodiment of an alignment of planogram contextual information with an image including the shelving unit. In FIG. 5, the graphical representation 500 illustrates an alignment of a left most vertical slice in the received image 501 with the planogram 503. The products on the left of the shelving unit are aligned with the planogram 503. There are mismatches on the right of the shelving unit because the alignment of the planogram is with the left most vertical slice of the received image 501. The grouping module 207 therefore uses multiple vertical slices with their corresponding alignments to align the planogram and subsequently assign the identified items in each slice to appropriate linear groups. In some embodiments, the grouping module 207 collects the linear groups into a first list of candidate linear groups.

In some embodiments, the grouping module 207 determines items in the received image that remain unassigned to the linear groups of the planogram due to an absence of overlap with the linear groups using a second criteria, proximity to previously assigned items. The grouping module 207 determines whether the unassigned items in the received image overlap with the items assigned to the linear groups. The grouping module 207 assigns the unassigned items to the same linear groups of the assigned items based on a presence of the overlap. In some embodiments, the grouping module 207 determines unassigned items in the received image that do not overlap with the assigned items. The grouping module 207 determines a distance (e.g., coordinate distance) of a non-overlapping item to a plurality of assigned items in the received image and assigns the non-overlapping item to a linear group based on the distance. For example, if the non-overlapping item is proximate to one assigned item more than the other assigned items, the grouping module 207 assigns the non-overlapping item to the linear group of the nearest assigned item in the received image.

It can be understood that two items are close to each other if the two items are next to each other (side by side) or on top of each other. In a retail environment, for example, products may be of different sizes, the grouping module 207 identifies corner locations of products as ideal locations to use to determine distance between products in the received image. For example, the grouping module 207 determines a distance from upper right corner of one product to the upper left corner of another product. If both the products are hanging by the pegs on the shelf in the received image, the two products may be close. In another example, the grouping module 207 determines a distance between the lower right corner of the one product and the lower left corner of another product. The two products may be close to each other if both products are placed on the shelf. In yet another example, the grouping module 207 determines a distance from the upper left corner of one product to the lower left corner of another product. The two products may be close if both products are stacked on top of each other. In some embodiments, the grouping module 207 assigns more weight to vertical distance between items compared to horizontal distance between items to determine a minimum of the distances.

At 914, the grouping module 207 determines whether there are more slices of the image. If there are more slices, at 916, the grouping module 207 determines another slice and the method 900 repeats the process from step 904. If there are no more slices, at 918, the grouping module 207 determines a list of linear groups in the image.

Figure 10:
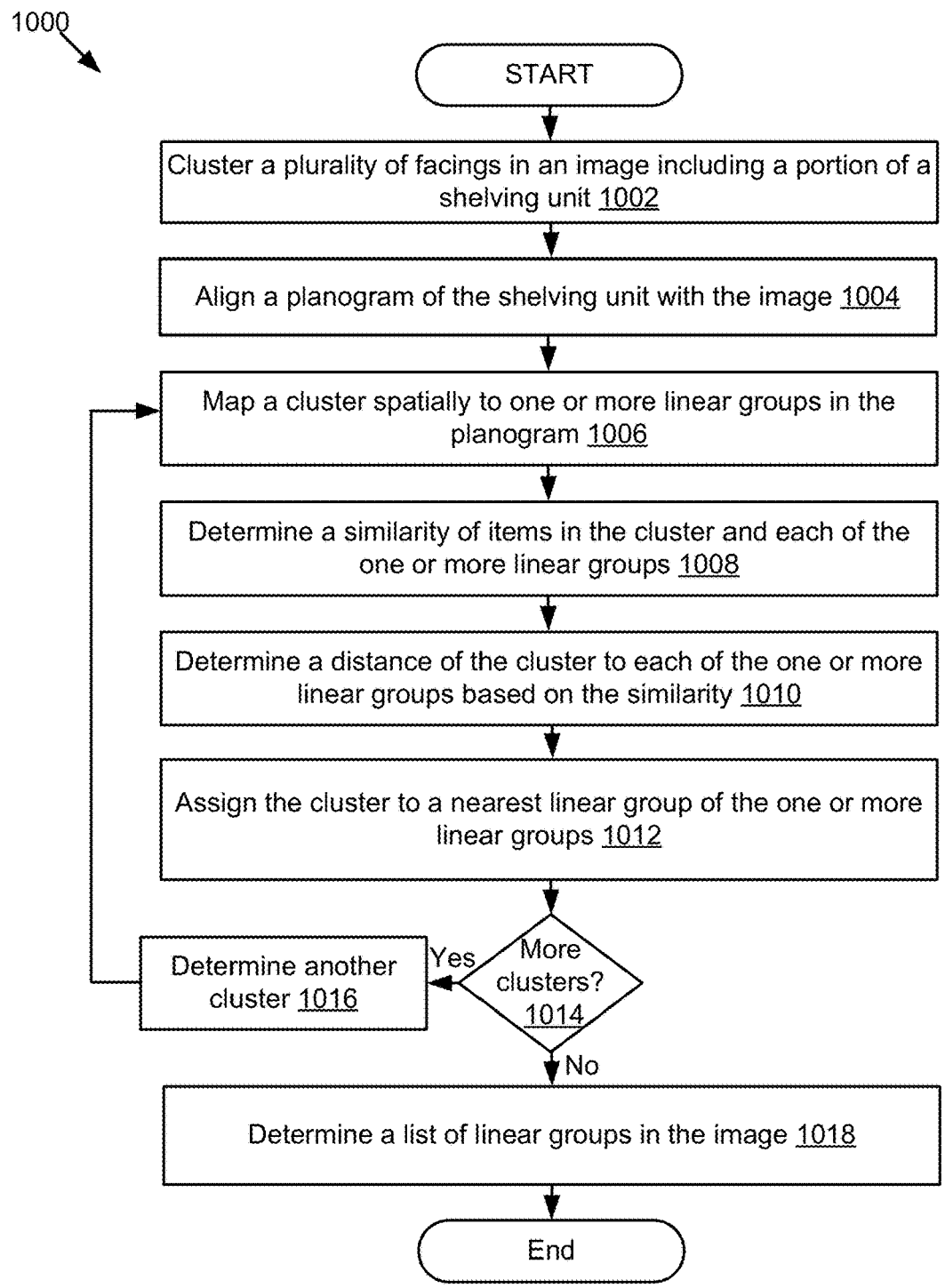
FIG. 10 is a flow diagram illustrating another embodiment of a method for determining a list of linear groups in an image including a shelving unit using a planogram of the shelving unit.

FIG. 10 is a flow diagram illustrating another embodiment of a method 1000 for determining a list of linear groups in an image including a shelving unit using a planogram of the shelving unit. At 1002, the grouping module 207 clusters a plurality of facings in an image including a portion of a shelving unit. At 1004, the grouping module 207 aligns a planogram of the shelving unit with the image. At 1006, the grouping module 207 maps a cluster spatially to one or more linear groups in the planogram. In some embodiments, the grouping module 207 independently maps each cluster to one or more linear groups of the planogram to assign each cluster to a linear group. In some embodiments, the grouping module 207 identifies items in a cluster and spatially maps the cluster onto one or more linear groups in the planogram. For example, the grouping module 207 maps a cluster with at least four items onto the linear groups in the planogram. At 1008, the grouping module 207 determines a similarity of items in the cluster and each of the one or more linear groups. For example, the grouping module 207 identifies three spatially nearest linear groups and determines product similarity between the cluster and each of the three nearest linear groups. At 1010, the grouping module 207 determines a distance of the cluster to each of the one or more linear groups based on the similarity. At 1012, the grouping module 207 assigns the cluster to a nearest linear group of the one or more linear groups. For example, the grouping module 207 determines one of the three linear groups is twice as good as the other two and assigns the cluster to that linear group. In some embodiments, the grouping module 207 identifies unassigned clusters in the received image. The grouping module 207 assigns the unassigned clusters to linear groups based on the unassigned clusters being near other clusters that have been assigned. For example, the grouping module 207 determines whether there is a 40 percent vertical overlap and a horizontal distance of four times a product size between the unassigned clusters and the assigned clusters. The product size can be a width of an unassigned product or a median over a set of widths of unassigned products. In some embodiments, the grouping module 207 assigns the cluster based on spatial geometry to the nearest linear group. At 1014, the grouping module 207 determines whether there are more clusters. If there are more clusters, at 1016, the grouping module 207 determines another cluster and the method 1000 repeats the process from step 1006. If there are no more clusters, at 1018, the grouping module 207 determines a list of linear groups in the image.

Figure 11:
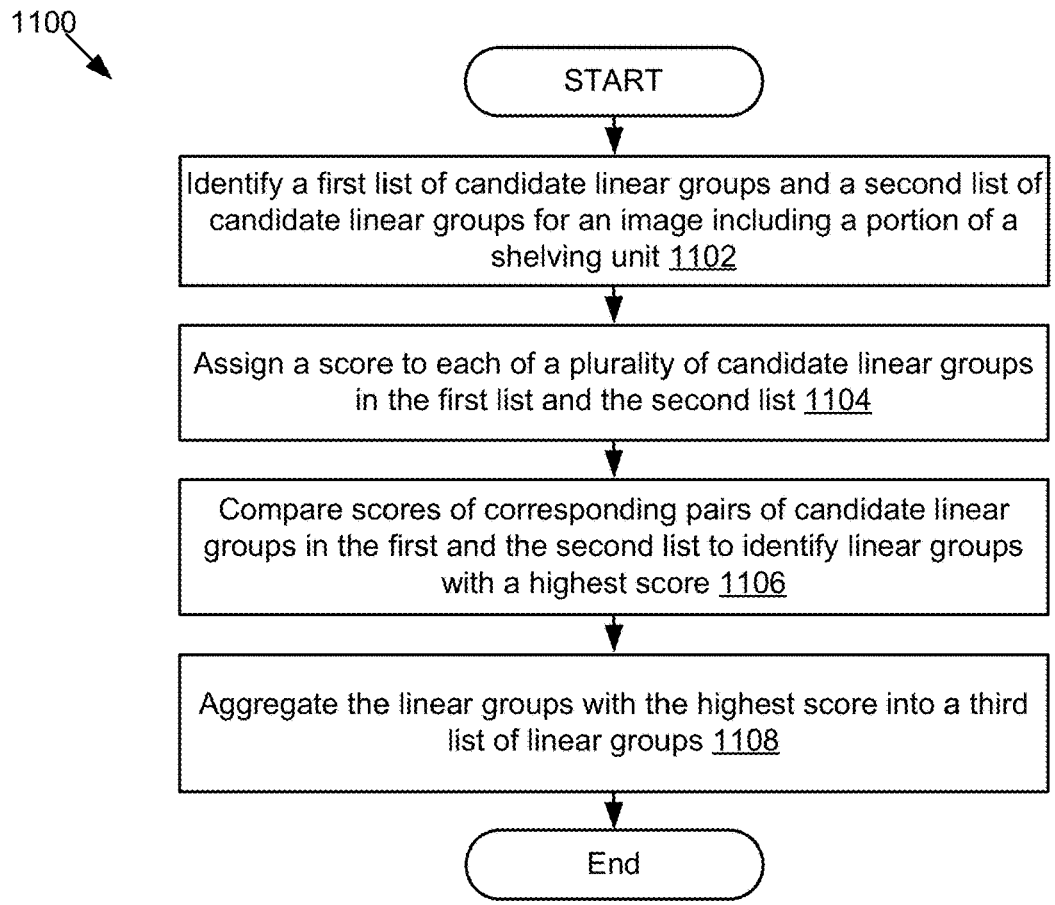
FIG. 11 is a flow diagram illustrating an embodiment of a method for determining a list including linear groups with a highest score.

FIG. 11 is a flow diagram illustrating an embodiment of a method 1100 for determining a list including linear groups with a highest score. At 1102, the grouping module 207 identifies a first list of candidate linear groups and a second list of candidate linear groups for an image including a portion of a shelving unit. At 1104, the grouping module 207 assigns a score to each of a plurality of candidate linear groups in the first list and the second list. The score can be composed of two terms. One term is matching value and the other term is a penalty. In some embodiments, the grouping module 207 assigns a matching value for every item in a linear group that has an identifier which appears in the planogram. For example, the grouping module 207 assigns a value of 1 to every item where the UPC for that item appears in the linear group of the planogram. In some embodiments, the grouping module 207 assigns a value of 0.5 if one of the alternate items of the top choice item appears in the linear group. In some embodiments, the grouping module 207 determines a penalty for every incorrect facing in the linear group. The grouping module 207 determines the score by aggregating the points and the penalty for the linear group. At 1106, the grouping module 207 compares scores of corresponding pairs of candidate linear groups in the first and the second list to identify linear groups with a highest score. At 1108, the grouping module 207 aggregates the linear groups with the highest score into a third list of linear groups.

A system and method for determining multiple linear groups of horizontally placed items in an image has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving an image including a portion of a shelving unit;
identifying a plurality of items in the image;
determining a plurality of facings based on the plurality of items;
determining whether a variation in a bottom edge of items in the plurality of facings satisfies a threshold value, the threshold value being based on a factor of a minimum dimension of the items in the plurality of facings;
responsive to determining that the variation in the bottom edge of items in the plurality of facings satisfies the threshold value, grouping the plurality of facings based on position and identification; and
determining a list of linear groups in the image.

2. The method of claim 1, wherein grouping the plurality of facings based on the position and the identification comprises:
clustering the plurality of facings; and
merging a plurality of clusters.

3. The method of claim 1, wherein determining the plurality of facings comprises:
determining a similarity of items in each one of the plurality of facings; and
categorizing each one of the plurality of facings based on the similarity of items.

4. The method of claim 3, wherein determining the similarity of items comprises:
determining a pair of items;
determining a first list of recognition results for a first item of the pair and a second list of recognition results for a second item of the pair;
determining a first length of the first list of recognition results and a second length of the second list of recognition results;
determining a count of matching recognition results in the first list and the second list of recognition results; and
determining a similarity of the pair of items by dividing the count by a geometric mean of the first length and the second length.

5. The method of claim 1, comprising:
receiving a planogram of the shelving unit;
extracting contextual information from the planogram; and
grouping the plurality of facings based on the position and the identification using the extracted contextual information.

6. The method of claim 5, wherein grouping the plurality of facings based on the position and the identification using the extracted contextual information comprises:
determining a plurality of slices in the image;
identifying items in each slice;
estimating locations of shelves based on identified items and aligning the planogram;
determining whether the identified items overlap with one or more linear groups in the planogram; and
assigning the identified items to the one or more linear groups based on criteria including an overlap satisfying a threshold proximity to previously assigned items.

7. The method of claim 6, wherein estimating locations of shelves based on identified items and aligning the planogram comprises:
estimating a bottom location of a top shelf and a bottom shelf using the identified items in each slice; and
aligning the planogram with the estimated bottom location of the top shelf and the bottom shelf.

8. The method of claim 4, wherein a range of a score of the similarity of the pair of items is between a minimum of zero and a maximum of one.

9. The method of claim 5, wherein grouping the plurality of facings based on the position and the identification using the extracted contextual information comprises:
aligning the planogram with the image;
mapping each cluster of the plurality of facings spatially to one or more linear groups in the planogram;
determining a similarity of items included within each cluster of the plurality of facings and the one or more linear groups;
determining a distance of each cluster of the plurality of facings to the one or more linear groups based on the similarity;
assigning each cluster of the plurality of facings to a nearest linear group of the one or more linear groups; and
determining the list of linear groups.

10. The method of claim 1, wherein determining the list of linear groups comprises:
identifying a first list of candidate linear groups;
identifying a second list of candidate linear groups;
assigning a score to each of a plurality of candidate linear groups in the first list and the second list;
comparing scores of corresponding pairs of candidate linear groups in the first list and the second list to identify linear groups with a highest score; and
aggregating the linear groups with the highest score into a third list of linear groups.

11. A system comprising:
one or more processors; and
a memory, the memory storing instructions, which when executed cause the one or more processors to:
receive an image including a portion of a shelving unit;
identify a plurality of items in the image;
determine a plurality of facings based on the plurality of items;
determine whether a variation in a bottom edge of items in the plurality of facings satisfies a threshold value, the threshold value being based on a factor of a minimum dimension of the items in the plurality of facings;
responsive to determining that the variation in the bottom edge of items in the plurality of facings satisfies the threshold value, group the plurality of facings based on position and identification; and
determine a list of linear groups in the image.

12. The system of claim 11, wherein to determine the plurality of facings, the instructions cause the one or more processors to:
determine a pair of items in each one of the plurality of facings;

determine a first list of recognition results for a first item of the pair and a second list of recognition results for a second item of the pair;

determine a first length of the first list of recognition results and a second length of the second list of recognition results;

determine a count of matching recognition results in the first list and the second list of recognition results;

determine a similarity of the pair of items by dividing the count by a geometric mean of the first length and the second length; and categorize each one of the plurality of facings based on the similarity of the pair of items.

13. The system of claim 11, wherein to group the plurality of facings based on the position and the identification, the instructions cause the one or more processors to:

receive a planogram of the shelving unit;
determine a plurality of slices in the image;
identify items in each slice;
estimate locations of shelves based on identified items and align the planogram;
determine whether the identified items overlap with one or more linear groups in the planogram; and
assign the identified items to the one or more linear groups based on the overlap satisfying a threshold.

14. The system of claim 13, wherein to group the plurality of facings, the instructions cause the one or more processors to:

align the planogram with the image;
map each cluster of the plurality of facings spatially to one or more linear groups in the planogram;
determine a similarity of items included within each cluster of the plurality of facings and the one or more linear groups;
determine a distance of each cluster of the plurality of facings to the one or more linear groups based on the similarity;
assign each cluster of the plurality of facings to a nearest linear group of the one or more linear groups; and
determine the list of linear groups.

15. The system of claim 11, wherein to determine the list of linear groups, the instructions cause the one or more processors to:

identify a first list of candidate linear groups;
identify a second list of candidate linear groups;
assign a score to each of a plurality of candidate linear groups in the first list and the second list;
compare scores of corresponding pairs of candidate linear groups in the first list and the second list to identify linear groups with a highest score; and
aggregate the linear groups with the highest score into a third list of linear groups.

16. A computer program product comprising a non-transitory computer readable medium storing a computer readable program, wherein the computer readable program when executed on a computer causes the computer to:

receive an image including a portion of a shelving unit;
identify a plurality of items in the image;
determine a plurality of facings based on the plurality of items;
determine whether a variation in a bottom edge of items in the plurality of facings satisfies a threshold value, the threshold value being based on a factor of a minimum dimension of the items in the plurality of facings;
responsive to determining that the variation in the bottom edge of items in the plurality of facings satisfies the threshold value, grouping the plurality of facings based on position and identification; and
determine a list of linear groups in the image.

17. The computer program product of claim 16, wherein to group the plurality of facings based on the position and the identification, the computer readable program causes the computer to:

determine a similarity of items in each one of the plurality of facings;
categorize each one of the plurality of facings based on the similarity of items;
cluster the plurality of facings; and
merge a plurality of clusters.

18. The computer program product of claim 17, wherein to determine the similarity of items, the computer readable program causes the computer to:

determine a pair of items;
determine a first list of recognition results for a first item of the pair and a second list of recognition results for a second item of the pair;
determine a first length of the first list of recognition results and a second length of the second list of recognition results;
determine a count of matching recognition results in the first list and the second list of recognition results; and
determine a similarity of the pair of items by dividing the count by a geometric mean of the first length and the second length.

19. The computer program product of claim 16, wherein to group the plurality of facings, the computer readable program causes the computer to:

receive a planogram of the shelving unit;
determine a plurality of slices in the image;
identify items in each slice;
estimate locations of shelves based on identified items and align the planogram;
determine whether the identified items overlap with one or more linear groups in the planogram; and
assign the identified items to the one or more linear groups based on the overlap satisfying a threshold.

20. The computer program product of claim 19, wherein to group the plurality of facings, the computer readable program causes the computer to:

align the planogram with the image;
map each cluster of the plurality of facings spatially to one or more linear groups in the planogram;
determine a similarity of items included within each cluster of the plurality of facings and the one or more linear groups;
determine a distance of each cluster of the plurality of facings to the one or more linear groups based on the similarity;
assign each cluster of the plurality of facings to a nearest linear group of the one or more linear groups; and
determine the list of linear groups.

* * * * *